US00RE37924E

(19) United States
(12) Reissued Patent
Kellogg et al.

(10) Patent Number: US RE37,924 E
(45) **Date of Reissued Patent: *Dec. 10, 2002**

(54) COLLAPSIBLE CONTAINER AND METHOD OF MAKING AND USING SAME

(75) Inventors: Michael S. Kellogg, Oconomowoc, WI (US); Dean B. Krotts, Milwaukee, WI (US)

(73) Assignee: Bajer Design & Marketing, Inc., Pewaukee, WI (US)

( * ) Notice: This patent is subject to a terminal disclaimer.

(21) Appl. No.: 09/644,894

(22) Filed: Aug. 23, 2000

Related U.S. Patent Documents

Reissue of:
(64) Patent No.: 5,971,188
Issued: Oct. 26, 1999
Appl. No.: 09/108,521
Filed: Jul. 1, 1998

(51) Int. Cl.[7] ..... A45C 7/00
(52) U.S. Cl. ..... 220/9.2; 190/126; 190/127; 383/12; 383/33; 383/104; 135/126
(58) Field of Search ..... 135/126, 125; 220/9.2, 9.3

(56) References Cited

U.S. PATENT DOCUMENTS

| | | | |
|---|---|---|---|
| 177,749 | A | 3/1876 | Redden |
| 216,227 | A | 6/1879 | Sedgwick |
| 217,362 | A | 7/1879 | Gardner |
| 218,277 | A | 8/1879 | Kilham |
| 251,325 | A | 12/1881 | Walters |
| 338,892 | A | 3/1886 | Walker |
| 344,340 | A | 6/1886 | Barrow |
| 356,301 | A | 1/1887 | Belknap |
| 414,622 | A | 11/1889 | Willits |
| 481,957 | A | 9/1892 | Klank |
| 665,942 | A | 1/1901 | Tabler |
| 929,430 | A | 7/1909 | Hill |
| 945,918 | A | 1/1910 | Crawford |

(List continued on next page.)

FOREIGN PATENT DOCUMENTS

| | | |
|---|---|---|
| DE | 2015649 | 2/1971 |
| DE | 41 14 916 | 11/1991 |
| FR | 589062 | 5/1925 |
| FR | 1380728 | 10/1964 |
| FR | 2635136 | 2/1990 |
| GB | 1367 | 5/1971 |
| JP | 6-42227 | 2/1994 |

*Primary Examiner*—Stephen P. Garbe
(74) *Attorney, Agent, or Firm*—Ryan Kromholz & Manion, S.C.

(57) ABSTRACT

A collapsible container having a plurality of side panels and a floor panel forming an enclosure having an open top. Each side panel comprises a flexible continuous loop frame, a web of material, and an edging material. The edging envelops the frame and is coupled to the periphery of the web. One or more handles may be attached to the container or formed within one or more of the side panels. A method of making and collapsing the container is also disclosed.

24 Claims, 13 Drawing Sheets

U.S. PATENT DOCUMENTS

| | | | |
|---|---|---|---|
| 975,745 | A | 11/1910 | Bower |
| 1,087,702 | A | 2/1914 | Van Patten |
| 1,135,892 | A | 4/1915 | Grosenbeck |
| 1,144,643 | A | 6/1915 | Elkins |
| 1,155,475 | A | 10/1915 | Fay |
| 1,180,574 | A | 4/1916 | Despot |
| 1,181,829 | A | 5/1916 | Bower |
| 1,206,618 | A | 11/1916 | Thrasher |
| 1,251,560 | A | 1/1918 | Myshow |
| 1,263,294 | A | 4/1918 | Taylor |
| 1,308,268 | A | 7/1919 | Wagner et al. |
| 1,360,844 | A | 11/1920 | Williams |
| 1,394,007 | A | 10/1921 | Hall |
| 1,520,532 | A | 12/1924 | Clark |
| 1,538,260 | A | 5/1925 | Street et al. |
| 1,581,888 | A | 4/1926 | Thomas |
| 1,583,083 | A | 5/1926 | Macaraig |
| 1,640,083 | A | 8/1927 | Ladd |
| 1,647,679 | A | 11/1927 | Williams |
| 1,691,904 | A | 11/1928 | Gamble |
| 1,703,066 | A | 2/1929 | Horn |
| 1,836,297 | A | 12/1931 | Vienna |
| 1,979,978 | A | 11/1934 | Martin |
| 1,994,235 | A | 3/1935 | Solomon |
| 1,999,424 | A | 4/1935 | Seitz |
| 2,009,035 | A | 7/1935 | Towers |
| 2,042,888 | A | 6/1936 | Flood |
| 2,057,942 | A | 10/1936 | Fay |
| 2,071,850 | A | 2/1937 | Miller |
| 2,115,308 | A | 4/1938 | Koch |
| 2,136,761 | A | 11/1938 | Simmons |
| 2,182,932 | A | 12/1939 | Sanford |
| 2,269,574 | A | 1/1942 | Benenfeld |
| 2,280,601 | A | 4/1942 | Otter |
| 2,295,584 | A | 9/1942 | Larson |
| 2,298,786 | A | 10/1942 | Dubofsky et al. |
| 2,361,743 | A | 10/1944 | Butler |
| 2,544,074 | A | 3/1951 | Ernst et al. |
| 2,575,893 | A | 11/1951 | Seaman |
| 2,600,501 | A | 6/1952 | Higgs |
| 2,625,973 | A | 1/1953 | Weldon et al. |
| 2,639,819 | A | 5/1953 | Marks |
| 2,664,131 | A | 12/1953 | Miller |
| 2,710,084 | A | 6/1955 | Braverman |
| 2,721,099 | A | 10/1955 | Rupp |
| 2,724,537 | A | 11/1955 | Fehr |
| 2,746,582 | A | 5/1956 | Cart |
| 2,767,757 | A | 10/1956 | Marder |
| 2,778,560 | A | 1/1957 | Pfeiffer |
| 2,780,402 | A | 2/1957 | Zucker et al. |
| 2,833,460 | A | 5/1958 | Votolato |
| 2,879,553 | A | 3/1959 | Keating |
| 2,958,357 | A | 11/1960 | Vorgan |
| 3,014,516 | A | 12/1961 | Mueller |
| 3,017,117 | A | 1/1962 | Klingler |
| 3,061,396 | A | 10/1962 | Hock |
| 3,126,933 | A | 3/1964 | Mason et al. |
| 3,160,307 | A | 12/1964 | Morrison |
| 3,233,644 | A | 2/1966 | Bono |
| 3,257,077 | A | 6/1966 | Corning |
| 3,260,396 | A | 7/1966 | Buch |
| 3,265,284 | A | 8/1966 | Tompkins |
| 3,310,089 | A | 3/1967 | Silverman |
| 3,354,924 | A | 11/1967 | Birrell et al. |
| 3,373,925 | A | 3/1968 | Gatward |
| 3,410,328 | A | 11/1968 | Sasai |
| D213,131 | S | 1/1969 | Hamilton |
| 3,439,865 | A | 4/1969 | Port et al. |
| D215,846 | S | 11/1969 | Curtin et al. |
| 3,480,059 | A | 11/1969 | Schoening |
| 3,502,091 | A | 3/1970 | Corbin |
| 3,583,748 | A | 6/1971 | Arndt |
| 3,603,367 | A | 9/1971 | Lehrman |
| 3,661,326 | A | 5/1972 | Wilson |
| 3,675,667 | A | 7/1972 | Miller |
| 3,675,981 | A | 7/1972 | Mallander |
| 3,696,850 | A | 10/1972 | Rosenblum |
| 3,709,237 | A | 1/1973 | Smith |
| 3,727,786 | A | 4/1973 | Fausel |
| 3,732,978 | A | 5/1973 | Reader |
| 3,733,758 | A | 5/1973 | Maier et al. |
| 3,796,342 | A | 3/1974 | Sanders et al. |
| 3,799,384 | A | 3/1974 | Hurkamp |
| 3,807,421 | A | 4/1974 | Geiger et al. |
| 3,834,528 | A | 9/1974 | Pickford et al. |
| 3,843,222 | A | 10/1974 | Berkun |
| 3,868,155 | A | 2/1975 | Cherubini |
| 3,880,459 | A | 4/1975 | Kelley |
| 3,883,026 | A | 5/1975 | Selz |
| 3,893,649 | A | 7/1975 | Cornell et al. |
| 3,935,958 | A | 2/1976 | Frangos |
| 3,946,903 | A | 3/1976 | Parker |
| 3,955,706 | A | 5/1976 | Whitaker |
| 3,960,161 | A | 6/1976 | Norman |
| 3,987,580 | A | 10/1976 | Ausnit |
| 3,990,463 | A | 11/1976 | Norman |
| 4,010,784 | A | 3/1977 | Nattrass et al. |
| 4,055,239 | A | 10/1977 | Weiner |
| 4,073,105 | A | 2/1978 | Daugherty |
| 4,094,639 | A | 6/1978 | McMillan |
| 4,118,089 | A | 10/1978 | Johnson et al. |
| 4,133,149 | A | 1/1979 | Angress |
| 4,134,225 | A | 1/1979 | Welch |
| 4,165,757 | A | 8/1979 | Marks |
| 4,170,082 | A | 10/1979 | Freedman |
| 4,180,113 | A | 12/1979 | Liebling |
| 4,195,804 | A | 4/1980 | Hujsak et al. |
| 4,212,130 | A | 7/1980 | Walker |
| 4,246,945 | A | 1/1981 | Sterling |
| 4,248,278 | A | 2/1981 | Blodgett |
| 4,248,442 | A | 2/1981 | Barrett |
| 4,265,261 | A | 5/1981 | Barker |
| 4,287,701 | A | 9/1981 | Washington |
| 4,299,365 | A | 11/1981 | Battle |
| 4,313,634 | A | 2/1982 | Williams |
| 4,352,457 | A | 10/1982 | Weick |
| 4,401,213 | A | 8/1983 | Lerner |
| 4,411,300 | A | 10/1983 | Rico |
| 4,427,110 | A | 1/1984 | Shaw, Jr. |
| D274,662 | S | 7/1984 | Fausel |
| 4,485,855 | A | 12/1984 | Dillingham |
| D279,249 | S | 6/1985 | Fausel |
| 4,580,776 | A | 4/1986 | Burkinshaw |
| 4,585,283 | A | 4/1986 | Redmon et al. |
| 4,603,432 | A | 7/1986 | Marino |
| 4,610,394 | A | 9/1986 | Bryson |
| 4,630,312 | A | 12/1986 | Milstein |
| 4,630,747 | A | 12/1986 | Chiang et al. |
| D288,019 | S | 1/1987 | Gebhard et al. |
| 4,635,411 | A | 1/1987 | Kurzen |
| 4,646,802 | A | 3/1987 | Basore et al. |
| D290,538 | S | 6/1987 | Basore |
| 4,683,927 | A | 8/1987 | Pyzer |
| 4,697,357 | A | 10/1987 | Van Vilet |
| 4,706,845 | A | 11/1987 | Schnurer et al. |
| 4,715,572 | A | 12/1987 | Robbins, III et al. |
| 4,716,918 | A | 1/1988 | Hayashida et al. |
| 4,728,066 | A | 3/1988 | Lang et al. |
| 4,730,748 | A | 3/1988 | Bane |
| 4,738,478 | A | 4/1988 | Bean, Jr. |
| 4,747,701 | A | 5/1988 | Perkins |

4,759,518 A 7/1988 Yardas
4,779,794 A 10/1988 Moore
4,781,300 A 11/1988 Long
4,783,031 A 11/1988 Ebentheuer
4,784,248 A 11/1988 Workman
4,790,029 A 12/1988 LaFleur et al.
4,813,520 A 3/1989 Lin
4,815,784 A 3/1989 Zheng
4,825,892 A 5/1989 Norman
4,854,501 A 8/1989 Ricci
4,858,634 A 8/1989 McLeese
4,862,602 A 9/1989 Krill
4,876,829 A 10/1989 Mattick
4,895,230 A 1/1990 King
4,899,967 A 2/1990 Johnson
4,903,584 A 2/1990 Styles
4,925,102 A 5/1990 Jones et al.
4,940,200 A 7/1990 Sawyer et al.
4,946,118 A 8/1990 Hastings
4,948,077 A 8/1990 Gonzalez
4,951,333 A 8/1990 Kaiser et al.
4,953,815 A 9/1990 Beymer et al.
4,964,859 A 10/1990 Feldman
4,989,749 A 2/1991 Choi
4,995,487 A 2/1991 Plath
D315,432 S 3/1991 Smith
5,009,189 A 4/1991 Neff
5,022,767 A 6/1991 Cardulla
5,024,262 A 6/1991 Huang
5,027,748 A 7/1991 Wolak
5,031,793 A 7/1991 Chen et al.
5,035,460 A 7/1991 Huang
5,036,999 A 8/1991 Bitsch
5,038,812 A 8/1991 Norman
5,054,507 A 10/1991 Sparks
5,072,828 A 12/1991 Irvine
5,082,219 A 1/1992 Blair
5,090,588 A 2/1992 Van Romer et al.
RE33,842 E 3/1992 Ebentheuer
5,116,138 A 5/1992 Macsenti et al.
5,118,201 A 6/1992 Cook
5,134,815 A 8/1992 Pickett
5,137,044 A 8/1992 Brady
5,143,283 A 9/1992 Lancaster
5,174,462 A 12/1992 Hames
5,195,649 A 3/1993 Wolters
5,213,147 A 5/1993 Zheng
5,222,513 A 6/1993 Hilliard
5,253,775 A 10/1993 Gould
5,263,672 A 11/1993 He
5,273,142 A 12/1993 Weber
5,301,705 A 4/1994 Zheng
5,324,490 A 6/1994 van Vlahakis et al.
5,335,805 A 8/1994 Chen
5,356,024 A 10/1994 Ho et al.
5,358,440 A 10/1994 Zheng
5,375,267 A 12/1994 Davis
5,382,087 A 1/1995 Pouch
5,393,023 A 2/1995 Callan
5,394,897 A 3/1995 Ritchey et al.
5,411,046 A 5/1995 Wan
5,429,437 A 7/1995 Shaw et al.
5,437,384 A 8/1995 Farrell
5,437,410 A 8/1995 Babasade
5,449,083 A 9/1995 Dougherty et al.
5,464,113 A 11/1995 Ho et al.
5,467,794 A 11/1995 Zheng
5,468,061 A 11/1995 Friess et al.
5,472,280 A * 12/1995 Rittmaster ..... 383/6
5,474,196 A 12/1995 Fausel et al.
5,492,675 A 2/1996 Brizard
5,560,385 A 10/1996 Zheng
5,576,621 A 11/1996 Clements
5,593,046 A 1/1997 Katsuura et al.
5,664,596 A * 9/1997 Zheng ..... 135/126
5,664,886 A 9/1997 Hutchinson
5,671,479 A 9/1997 Dedrick
5,722,446 A 3/1998 Zheng
5,746,514 A 5/1998 Orensten
5,762,530 A 6/1998 Zheng
5,778,915 A 7/1998 Zheng
5,800,067 A 9/1998 Easter
5,816,279 A 10/1998 Zheng
5,816,954 A 10/1998 Zheng
5,827,104 A 10/1998 Zheng
5,845,697 A 12/1998 Zheng
5,853,313 A 12/1998 Zheng
D406,423 S 3/1999 Kellogg et al.
D407,765 S 4/1999 Zheng
5,901,926 A 5/1999 Zheng
5,910,038 A 6/1999 Zheng
5,910,058 A 6/1999 Zheng
5,927,793 A 7/1999 McGrath, Jr.
5,938,496 A 8/1999 Zheng
5,941,265 A 8/1999 Zheng
5,964,533 A 10/1999 Ziglar
5,967,357 A 10/1999 Kellogg et al.
5,971,188 A 10/1999 Kellogg et al.
5,975,101 A 11/1999 Zheng
5,992,045 A 11/1999 Kellogg et al.
5,992,676 A 11/1999 Taxi
6,006,772 A 12/1999 Zheng
6,059,912 A 5/2000 Kellogg et al.
D431,361 S 10/2000 Kellogg et al.
D433,810 S 11/2000 Kellogg et al.
D438,009 S 2/2001 Kellogg et al.
6,220,998 B1 4/2001 Kellogg et al.

* cited by examiner

FIG. 24A
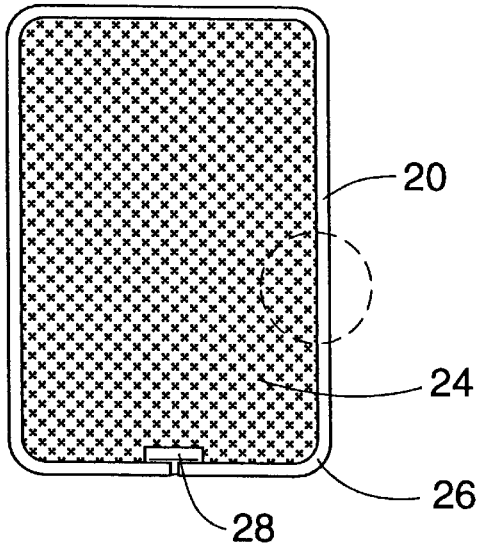
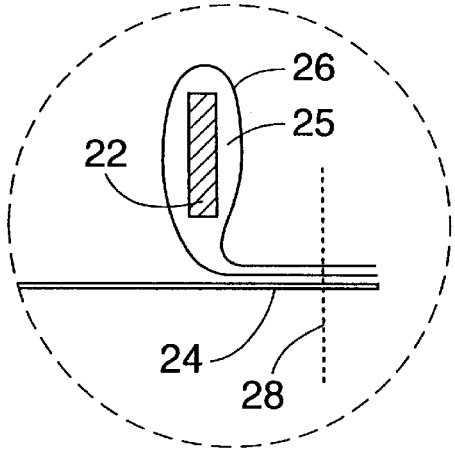
FIG. 24B
FIG. 25
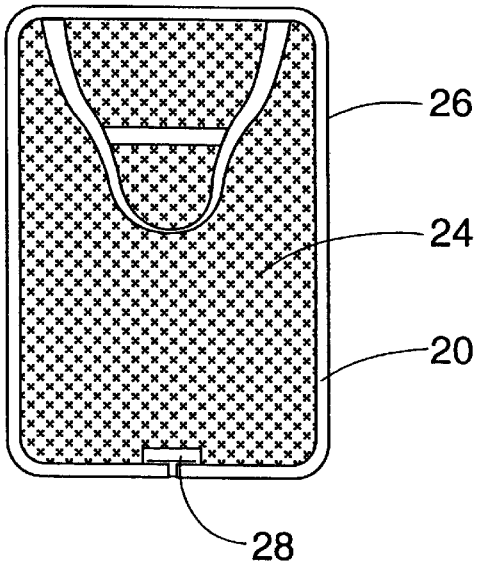

COLLAPSIBLE CONTAINER AND METHOD OF MAKING AND USING SAME

Matter enclosed in heavy brackets [ ] appears in the original patent but forms no part of this reissue specification; matter printed in italics indicates the additions made by reissue.

BACKGROUND OF THE INVENTION

The present invention relates generally to household products and specifically to a collapsible container with handles and a method of making and using such a container for convenient storage and transportation of said items.

A typical household often encounters the need for temporary storage of garments prior to washing or cleaning. Regardless of the place where laundry or cleaning is done, either at home or in a commercial setting, soiled garments need to be sorted, stored, and eventually transported to a designated place. The present invention can be utilized for garment sorting, storage and transportation. At the same time, the present invention can also be used for other purposes, such as storage or transportation of toys or other objects. Accordingly, its use is not to be limited to storage or transportation of soiled garments.

Numerous devices are known in the art to provide effective storage of soiled garments, for example laundry baskets, conventional hampers, or clothing bags. For example, U.S. Pat. No. 2,625,973 to Weldon et al. teaches a laundry hamper comprising a rectangular frame having upper and lower portions that telescope within one another in a detachable manner. The lower portion includes a base frame, while the upper portion comprises a top frame. A cover is secured by a hinge to the top frame and an outer bag surrounds the rectangular frame. A plurality of small inner bags are provided within the outer bag. U.S. Pat. No. 1,581,888 to Thomas discloses a collapsible receptacle comprising two rectangular wire frames, hingedly secured together, means for holding the frames to form a triangularly shaped structure, and a fabric portion covering the frames and providing an enclosure.

However, all these prior art devices are voluminous in their expanded state, are uneasy to fold or collapse, are still relatively voluminous in their collapsed state, and are difficult to manipulate. The present invention solves the above-mentioned shortcomings and provides a convenient, easy to manipulate, and ergonomic means for storing or transporting garments or other objects.

SUMMARY OF THE INVENTION

The present invention relates generally to household products and specifically to a collapsible container and method of making and using the same.

According to the present invention, the foregoing and other advantages are obtained by providing a collapsible container comprising a plurality of side panels and a floor panel forming an enclosure having an open top. In the preferred embodiment, each side panel comprises a flexible continuous loop frame, a web of material, and an edging material. The edging envelops the frame and is coupled to the periphery of the web. The floor panel is attached to the bottom side of each side panel thus forming the container.

In an alternate embodiment, each side panel is attached to a side panel separator, which in turn is connected to the next adjacent side panel. The floor panel is attached to both the bottom side of each side panel and to the side panel separators, thus providing means for holding articles within the container and for supporting the container in its expanded state.

In accordance with an aspect of the invention, at least one handle member is coupled to opposite side panels at the open top of the container. Alternatively, the handle may be coupled to only one side panel or may be an aperture formed within one or more of the side panels.

In accordance with another aspect of the invention, an optional storage pouch may be coupled to one of the side panels at the open top of the container. The present invention is easily collapsed into a compact state and the pouch allows storage of the container in its collapsed, compact state.

In another alternate embodiment, the collapsible container further comprises a divider panel, the divided panel being attached to diagonally opposite edgings of the side panels. In yet another alternate embodiment, the collapsible container further comprises at least two divider panels, preferably arranged substantially parallel to each other and being coupled to opposite side panels to create at least three separate compartments within the container.

A preferred method of manufacturing the collapsible container includes the steps of attaching each handle member to a side of two opposite webs. The edging is next coupled to each web such that the edging surrounds the perimeter of the web and forms a channel or pocket through which the frame will later be inserted. After the requisite number of side panels has been formed, each side of the floor panel is attached to the bottom side of each side panel. Next, a side of each side panel is connected with a side of an adjacent side panel. The frame for each side panel is inserted through the channel formed by each edging. The ends of each frame member are connected, preferably using a crimped butt connector, to give the collapsible container its ability to freely stand in a rigid, expanded, upright state.

An alternate method of manufacturing the collapsible container includes the steps of attaching each handle member to a side of two opposite webs. Coupling the edging to each web such that the edging surrounds the perimeter of the web and forms a channel or pocket through which the frame will later be inserted. After the requisite number of side panels has been formed, each corner of the floor panel is attached to one end of each side panel separator. Next each side panel is connected with one side of the floor panel and with two adjacent side panel separators. The frame for each side panel is inserted through the channel formed by each edging. The ends of each frame member are connected, preferably using a crimped butt connector, to give the collapsible container its ability to freely stand in a rigid, expanded, upright state.

From the expanded state, the container can be folded and collapsed for storage or transportation. The preferred steps of collapsing the container include grasping opposite corners of the floor panel and biasing one corner toward the other until all side panels are adjacent and overlay each other. The container is now partially collapsed but each side panel is still in an expanded state. Next, the handle members and the floor panel are inserted in between any two of the adjacent overlaying side panels. By rotating two opposite corners of the flattened, overlaying side panels in opposite directions while biasing the two corners toward each other, the structure will form three overlaying circular loops folded adjacently. Finally, the three overlaying loops are placed into the storage pouch. The pouch prevents the container from springing back into its fully expanded condition.

DESCRIPTION OF THE DRAWINGS

FIGS. 22A through 30 depict the preferred method of manufacturing the collapsible container.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention, a collapsible container 10, is illustrated in FIGS. 1 through 4.

Figure 4:
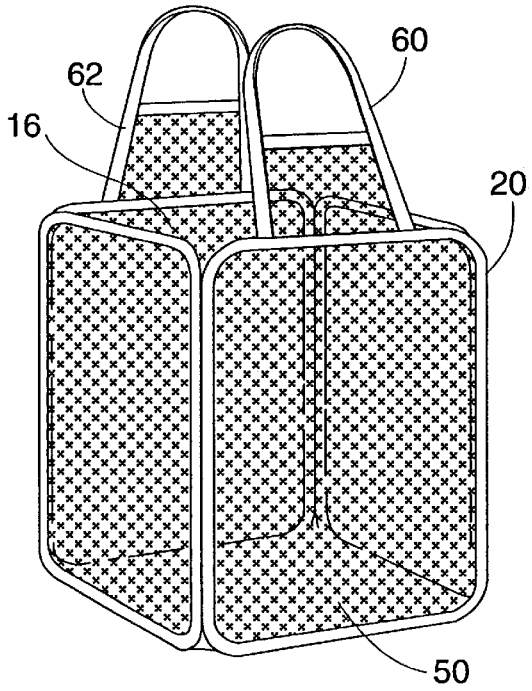
FIG. 4 is a perspective view of the collapsible container.
Figure 5:
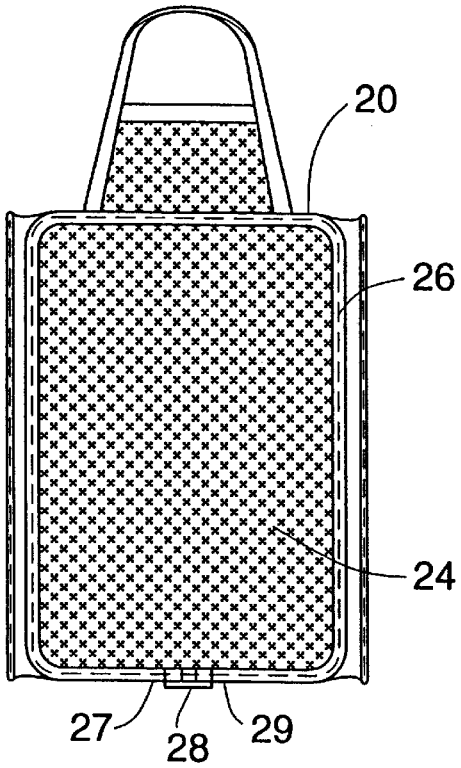
FIG. 5 is a front plan view of the preferred embodiment of the collapsible container.

As shown in FIG. 4, the container 10 comprises four rectangular side panels 20, a floor panel 50, and two handles 60 and 62. The side and floor panels 20 and 50 are connected to one another to form a substantially rectangular container having an open top 16.

Figure 1:
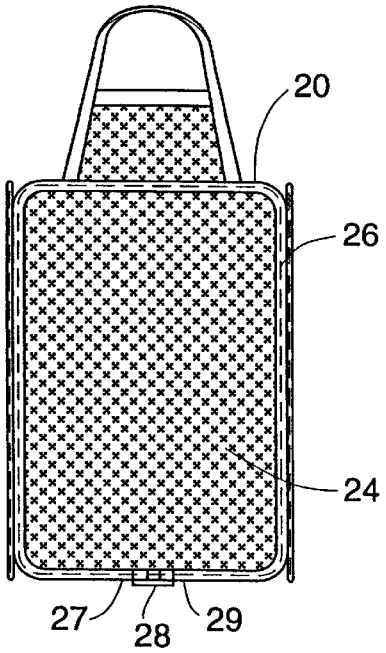
FIG. 1 is a front plan view of the collapsible container.
Figure 2:
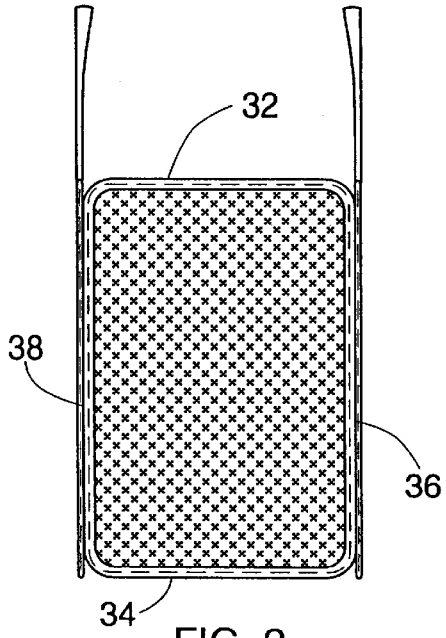
FIG. 2 is a side plan view of the collapsible container.
Figure 3:
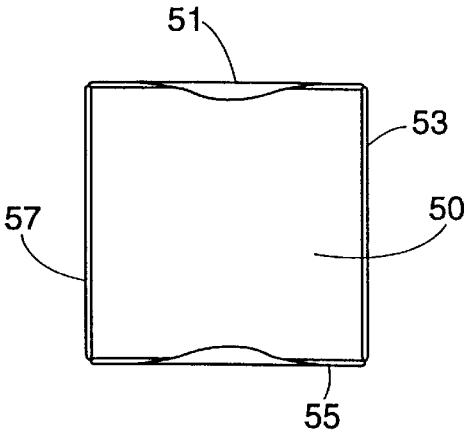
FIG. 3 is a top plan view of the collapsible container.
Figure 6A:
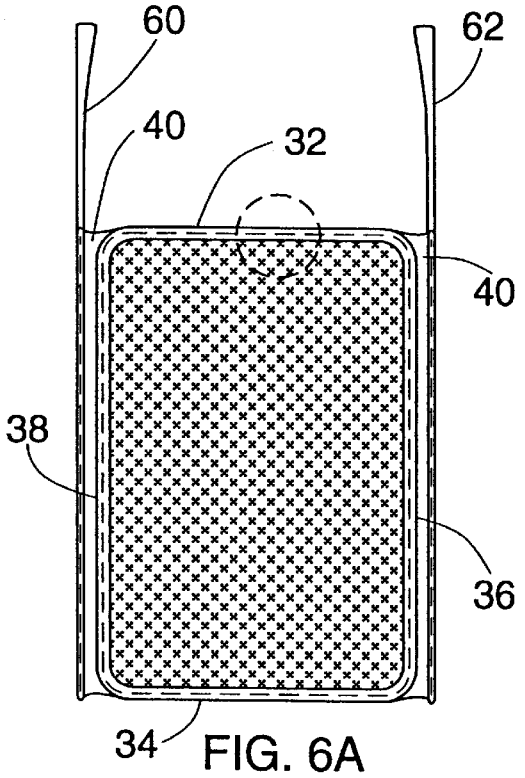
FIG. 6A is a side plan view of the collapsible container.
Figure 6B:
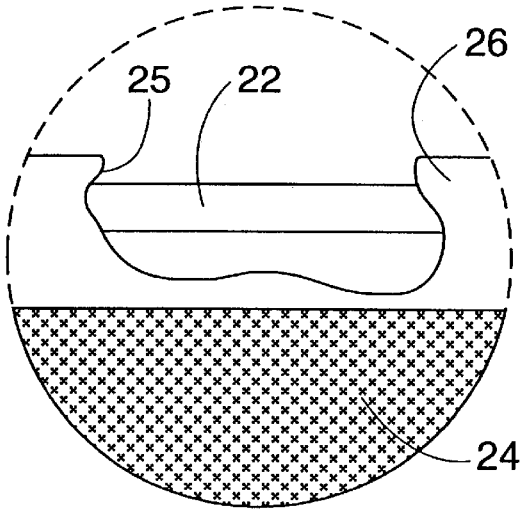
FIG. 6B is a partially cut-away view from FIG. 2A showing the frame member 22.

Referring to FIGS. 1 and 2 and as seen in detail in FIG. 6A, each side panel 20 further comprises a frame 22, a web 24, and an edging 26. The frame 22 is flexible, preferably formed from a sufficiently stiff yet resilient, material such as spring steel wire or plastic, and is contained within the channel or pocket 25 formed by the edging 26. The frame 22 forms a continuous loop. Preferably, the frame 22 has a rectangular cross-section, but a material with a different geometric cross-section can be used. The web 24 is a flexible foldable material, such as nylon cloth or nylon mesh, but can be any suitably flexible material. The nylon, or other flexible material, may be solid or perforated. The perimeter of the web 24 is stitched to the edging 26 such that the edging 26 forms a pocket 25 about the periphery of the web 24. The edging 26 is a foldable, but stretch-resistant material capable of housing the frame 22 within its pocket 25. The edging 26 has two ends 27 and 29.

A seam cover 28, also made out of a foldable stretch-resistant material, may be provided to cover the ends 27 and 29 of the edging 26, thereby protecting the frame 22 from escaping out of the edging 26. As shown in FIG. 1, the seam cover 28 is also stitched to the web 24.

Figure 7:
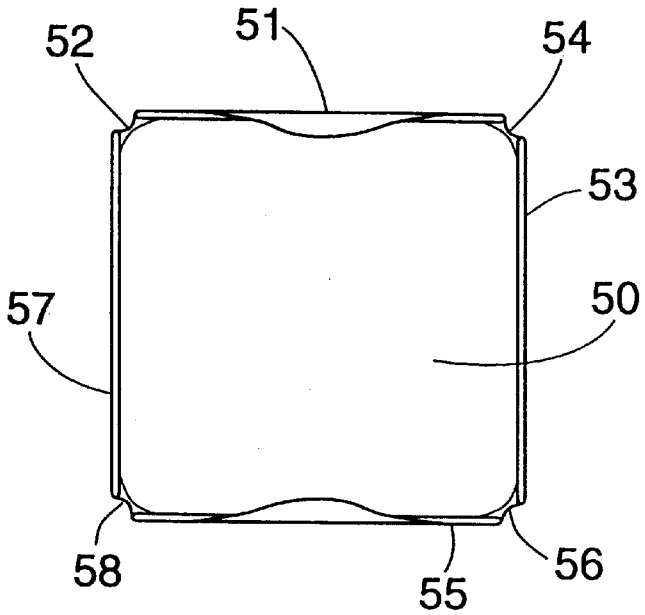
FIG. 7 is a top plan view of the collapsible container.

As shown in FIG. 7, the floor panel 50 is also a foldable web of material and has a generally rectangular shape. The floor panel 50 has four corner sections 52, 54, 56, 58 and is attached to four substantially perpendicular sides 51, 53, 55, 57 of each side panel 20. The floor panel 50 provides means for holding the garments or other objects (not shown) within the container 10 and for supporting the container 10 in its expanded state.

Referring now to FIGS. 5–8, the preferred embodiment of the collapsible container 10 is shown. The preferred embodiment includes side panel separators 40 located between each side panel 20. However, it should be noted that the side panel separators 40 are not required to practice the present invention. The side panel separators 40 are shown to be substantially longitudinal, each including an end 42 attached preferably by means of stitching to one of the corner sections 52, 54, 56, 58 of the floor panel 50. The other end 44 of each separator 40 corresponds to the open top 16 of the container 10. The side panel separators 40 are preferably formed from a stretch-resistant material similar to the material used for the seam covers 28 or the edging 26.

As shown in FIG. 6A, each rectangularly-shaped side panel 20 includes a top side 32 corresponding to the open top 16 of the container 10, a floor side 34 attached to one of the sides 51, 53, 55, 57 of the floor panel 50, and two lateral sides 36 and 38. Referring just to FIG. 6A, each lateral side 36 and 38 is attached to a side panel separator 40 adjacent to the side panel 20.

Figure 8:
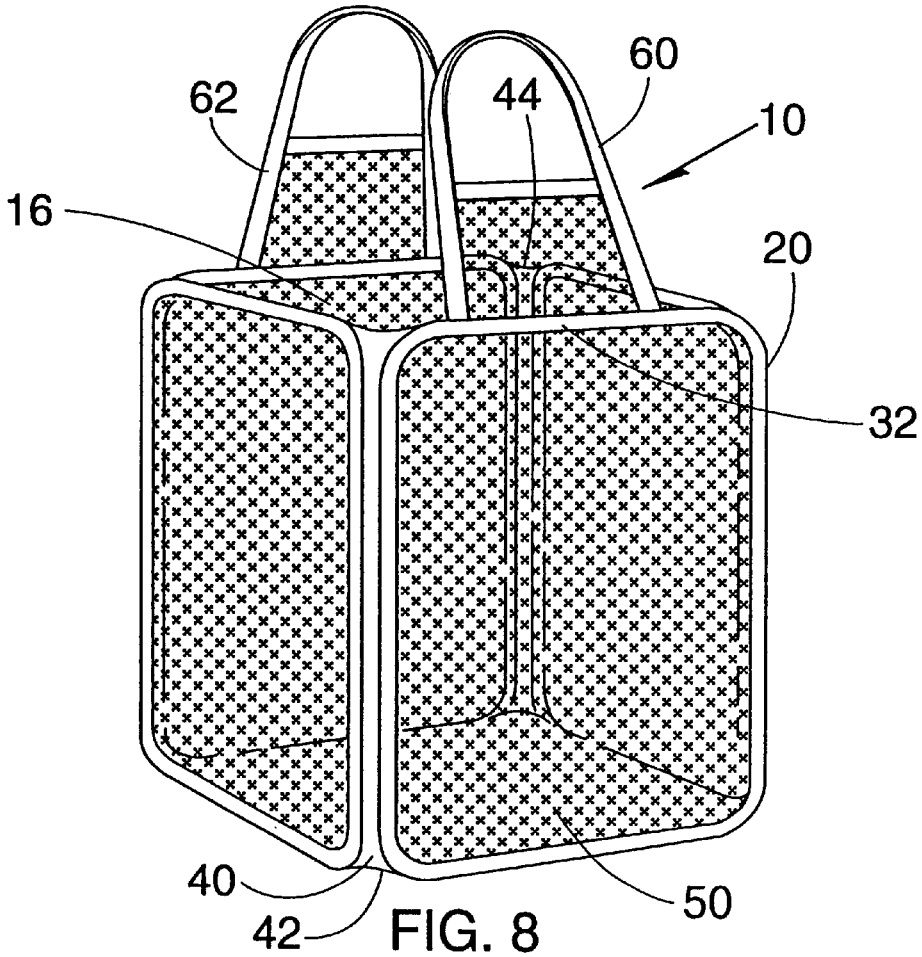
FIG. 8 is a perspective view of the collapsible container.
Figure 9:
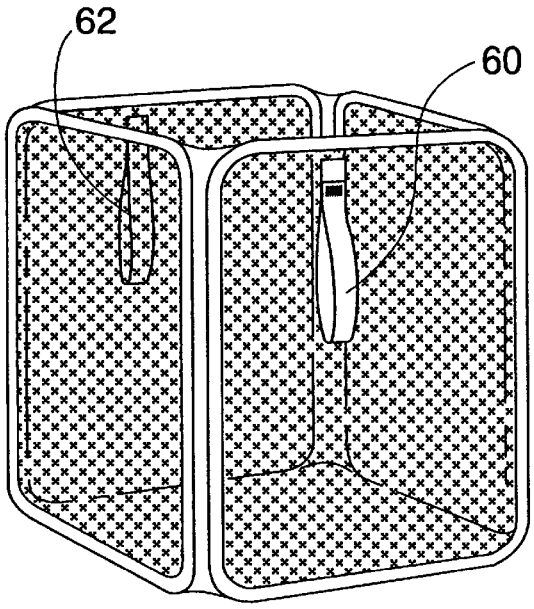
FIGS. 9–12 depict four alternative embodiments of the collapsible container, namely showing different handle configurations.
Figure 10:
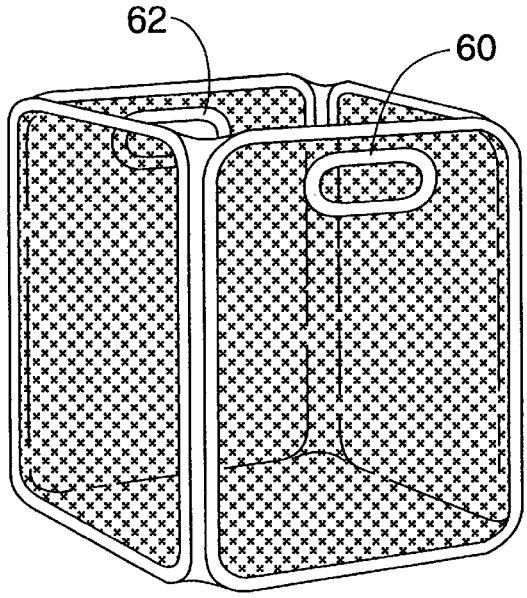
Figure 11:
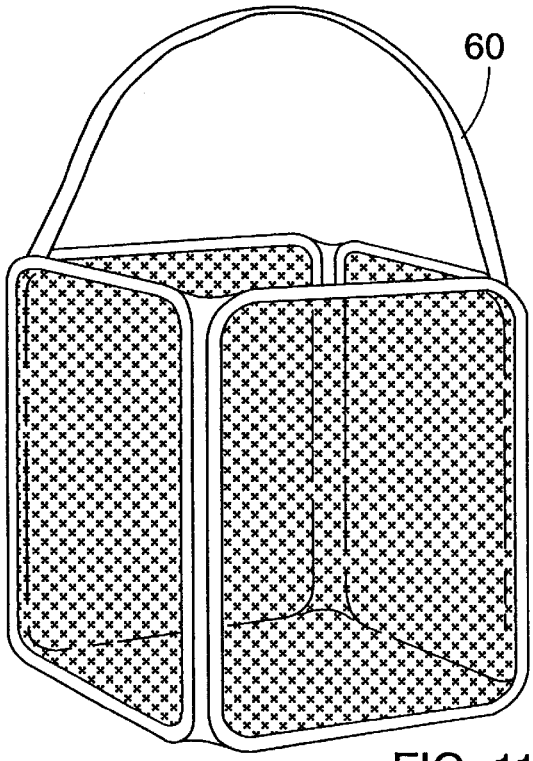
Figure 12:
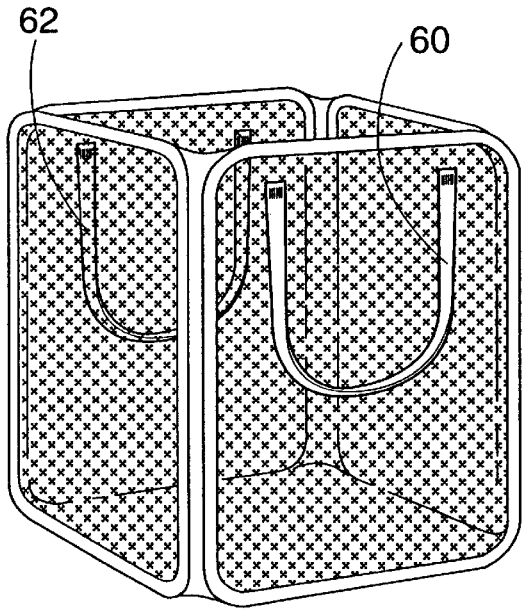

As depicted in FIGS. 4 and 8, the handles 60 and 62 have both ends connected to the top side 32 of two opposing side panels 20. The handles 60 and 62 are formed from a stretch-resistant material having a mesh web that extends between a portion of each strap side. The handles for the present invention are not limited to the particular type shown in FIGS. 4 and 8. Several alternate embodiments are shown in FIGS. 9 through 12, illustrating different handle members. In FIG. 9, the handle members 60 and 62 are straps stitched to opposite side panels. FIG. 10 depicts an alternate embodiment wherein the handle members 60 and 62 are apertures or openings formed in the webs 24 of two opposite side panels 20. In FIG. 11, one handle member 60 is shown as a strap coupled to diagonally opposed side seam separators 40. In FIG. 12, the handles 60 and 62 are preferably stitched directly to the webs 24 of two opposite side panels 20.

Figure 13:
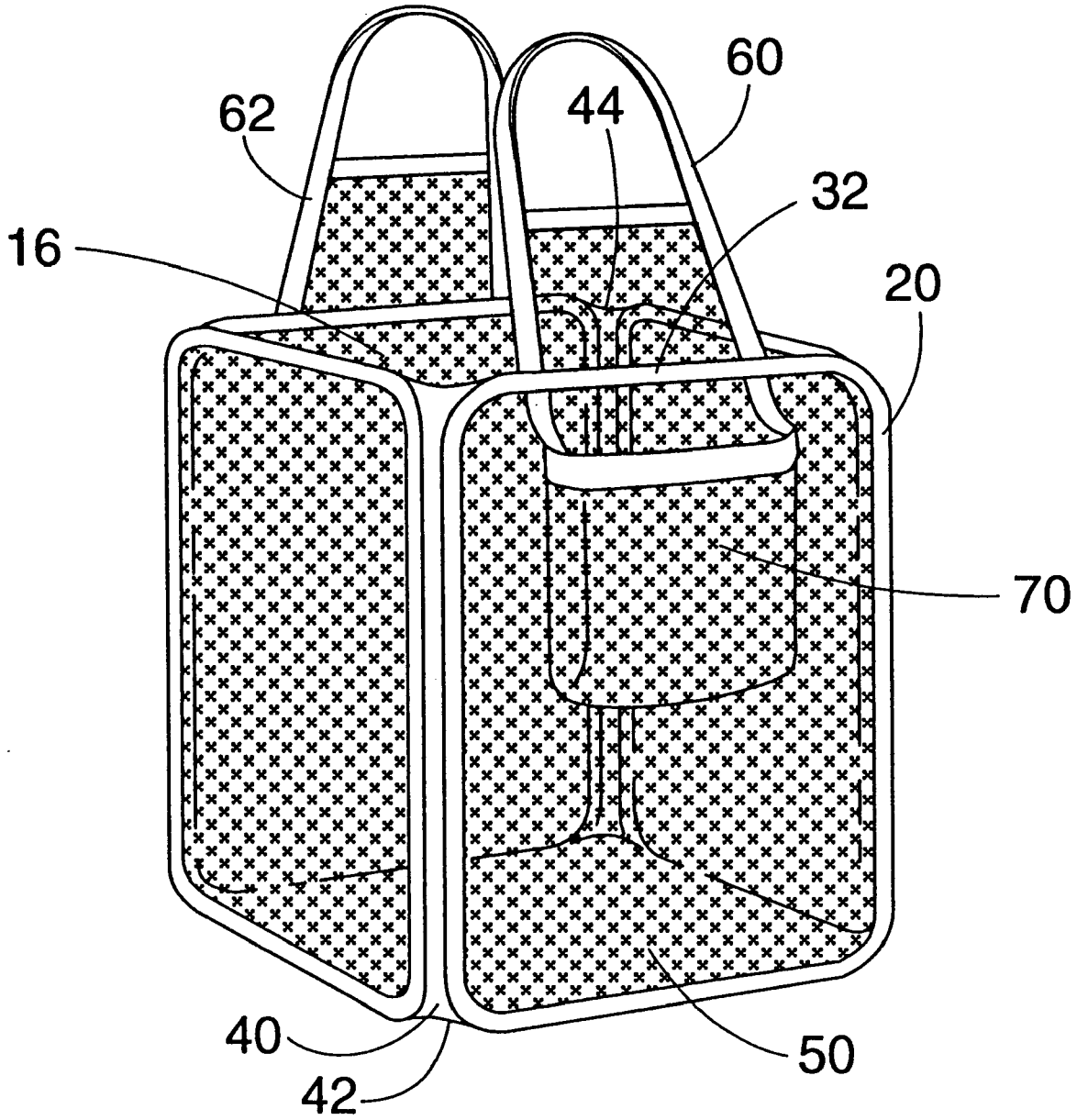
FIG. 13 is a perspective view of the collapsible container including a storage pouch.
Figure 14:
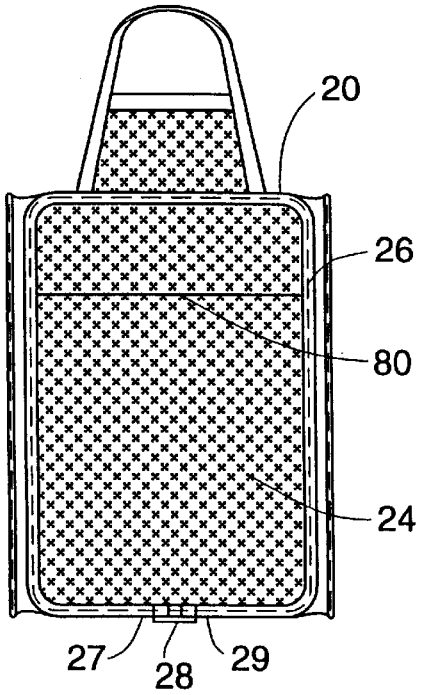
FIG. 14 is a front plan view of a fifth embodiment of the collapsible container, namely a two-compartment container.
Figure 15:
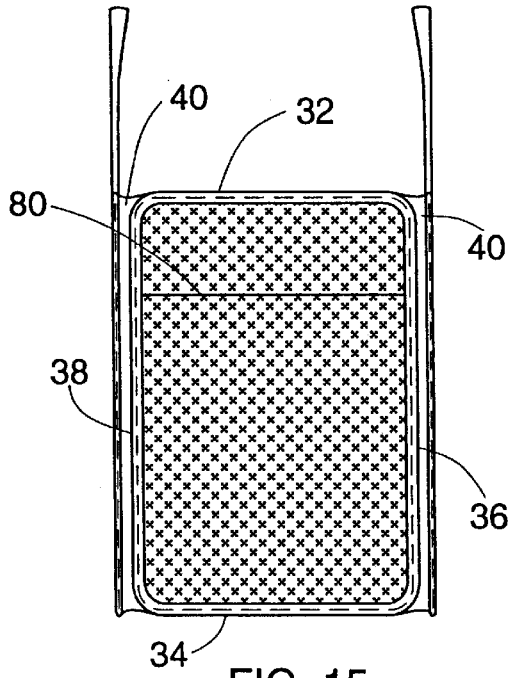
FIG. 15 is a side plan view of a fifth embodiment of a fifth embodiment of the collapsible container.
Figure 16:
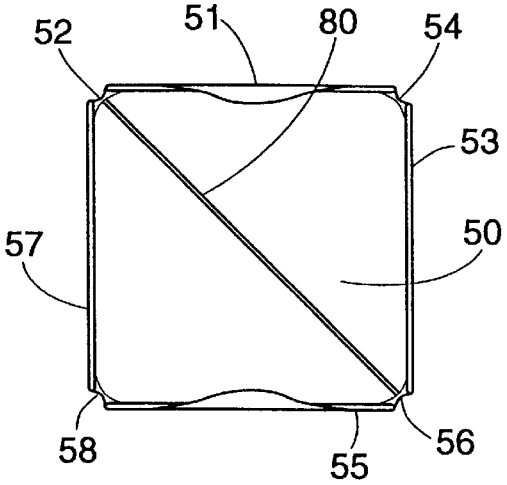
FIG. 16 is a top plan view of a fifth embodiment of the collapsible container.
Figure 17:
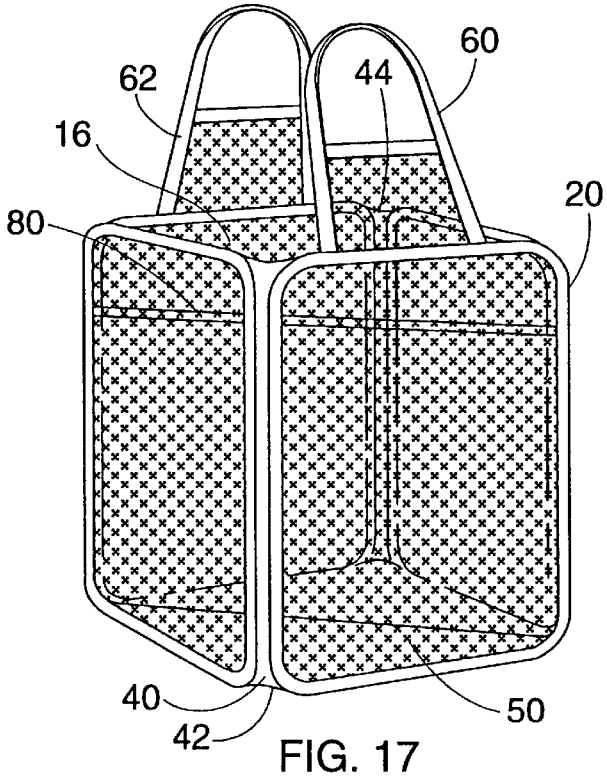
FIG. 17 is a perspective view of a fifth embodiment of the collapsible container.
Figure 21:
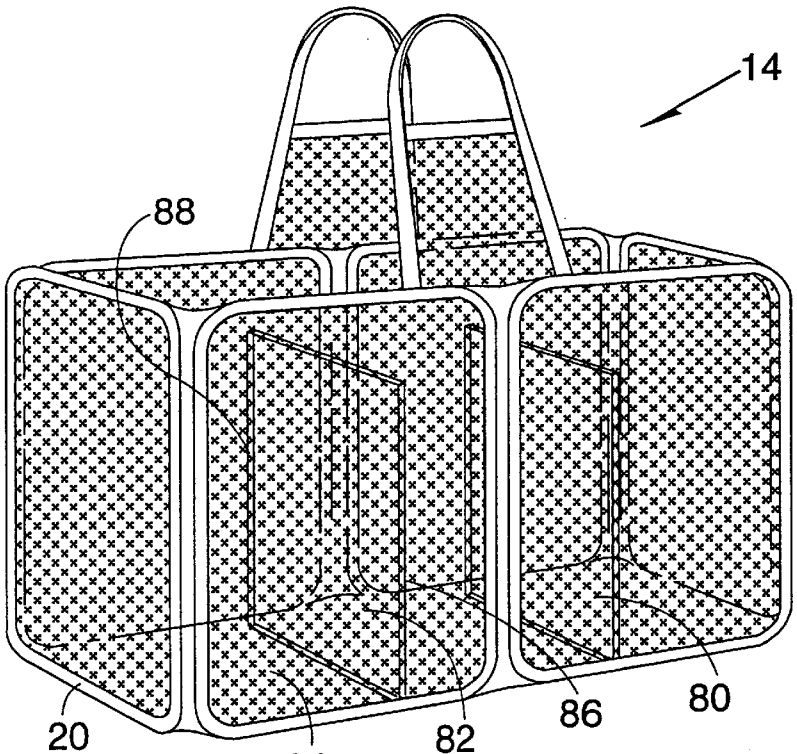
FIG. 21 is a perspective view of a sixth embodiment of the collapsible container.
Figure 19:
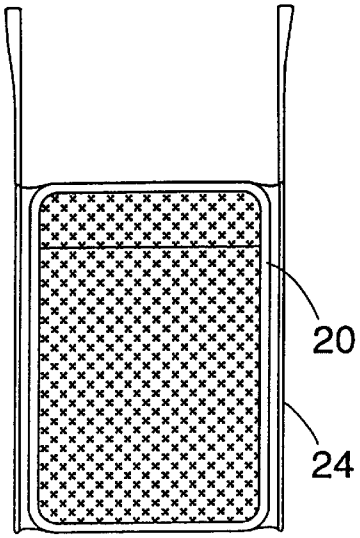
FIG. 19 is a side plan view of a sixth embodiment of a fifth embodiment of the collapsible container.
Figure 18:
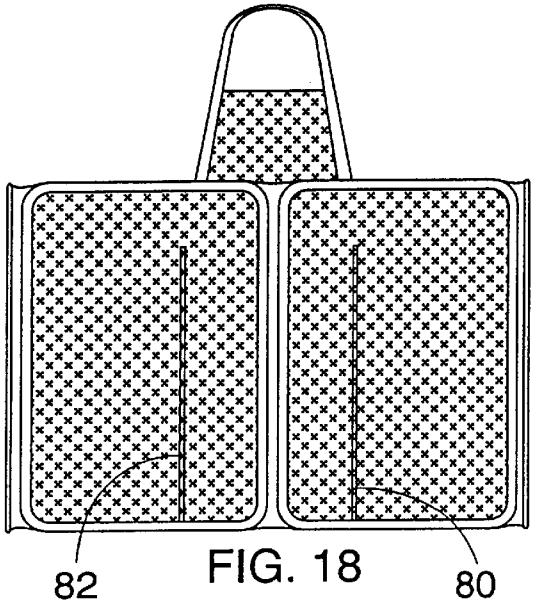
FIG. 18 is a front plan view of a sixth embodiment of the collapsible container, namely a three-compartment container.

As shown in FIG. 13, an optional storage pouch 70 may be formed from a foldable material, such as nylon mesh, and stitched to the side 32 of one of the side panels 20. The storage pouch 70 is dimensioned to accommodate the container 10 in its collapsed state as later described.

Although stitching is presented as the preferred means for attaching or connecting the elements of the container 10 and permitting relatively convenient folding of the container 10, it is to be understood that other methods of attachment can be used in this invention. Such of methods may include heat sealing, gluing and the like. Accordingly, construction of the collapsible container should not be limited to stitching alone.

FIGS. 14 through 17 depict an alternative embodiment of the collapsible container 12. The container 12 further includes a divider panel 80. Divider panel 80 is connected to opposite side seam separators 40 thereby dividing the interior of the container 12 into two separate chambers.

FIGS. 18 to 21 show a second alternate embodiment of the collapsible container 14. The container 14 comprises six side panels 20 and two divider panels 80 and 82. The divider panels 80 and 82 are arranged substantially parallel to one another. Each divider panel 80 and 82 is made out of a foldable material, such as nylon mesh, and has two sides 86 and 88 stitched to webs 24 of two opposite side panels 20. The divider panels 80 and 82 separate the interior of the container 14 into three separate compartments for improved sorting and storage of objects.

FIGS. 22 to 30 show various stages in the manufacturing process of the preferred embodiment of collapsible container 10. Referring to FIGS. 22A and 22B, the step of stitching the handle 60 to the top side 32 of two (2) of the webs 24 is shown. Specifically, the stitching is shown at 90.

Figure 20:
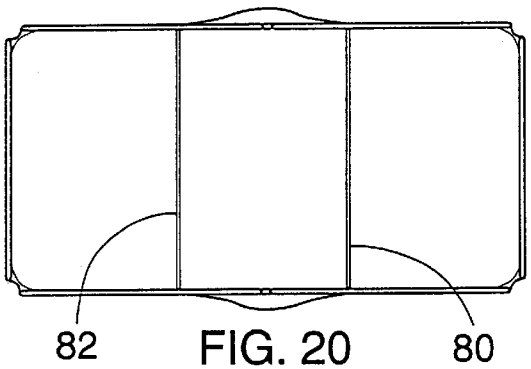
FIG. 20 is a top plan view of a sixth embodiment of the collapsible container.
Figure 22A:
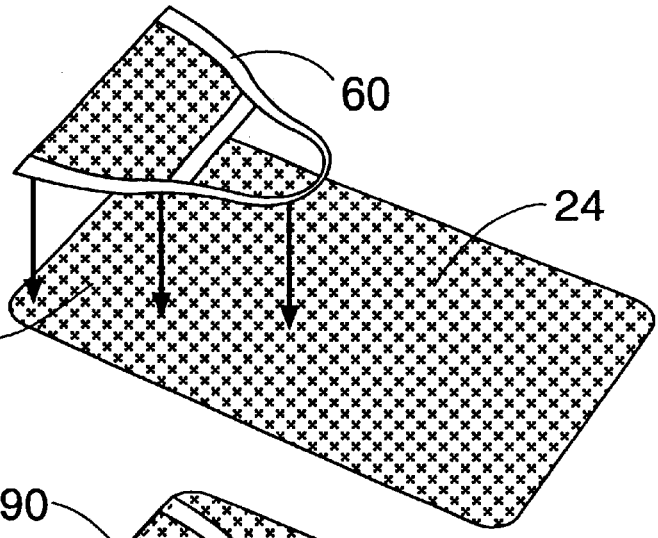
Figure 22B:
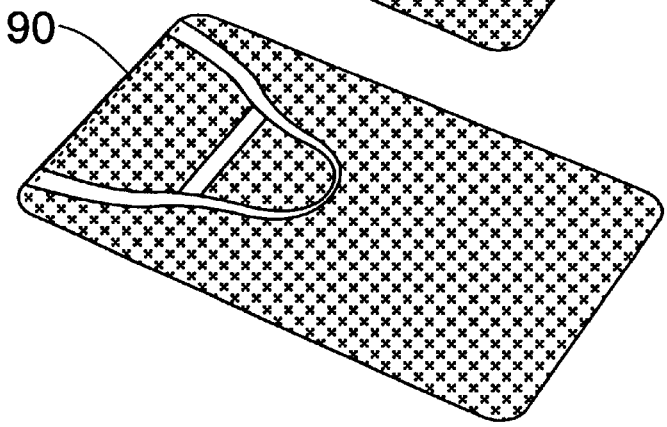
Figure 23:
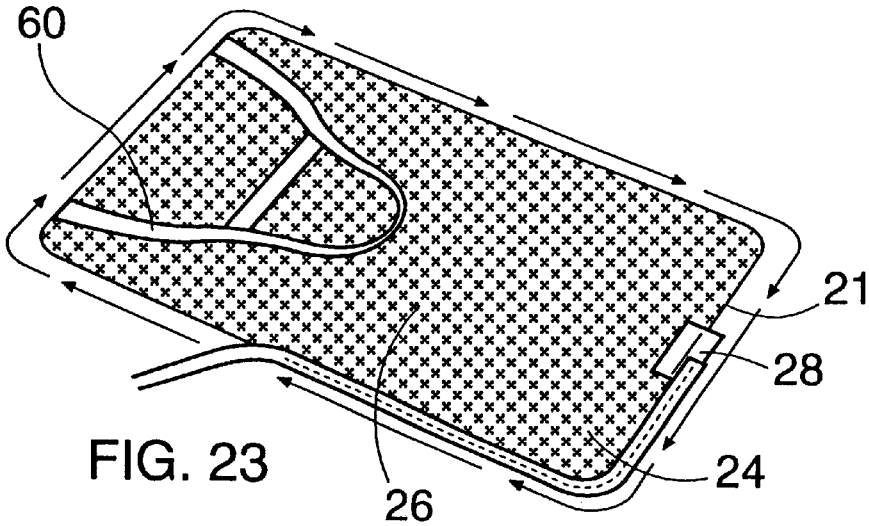

In FIG. 23, a seam cover 28 is partially stitched to side 21 of each of the four (4) webs 24. In the two (2) webs having handles 60 or 62, the seam cover 28 is placed and sewn opposite to the handle 60 or 62. Each seam cover 28 is preferably placed in the middle of the side 21 and includes a flap or unstitched portion, but it is to be understood that it could be placed anywhere on any side of each of the webs 24. Referring now to FIG. 24B, the edging 26 is then folded in a channel-like fashion around the periphery of the web 24 and stitched to the web 24, surrounding the perimeter of the web 24. The stitching is shown at 28. The stitched edging 26 forms a pocket 25 around the periphery of each web 24. In the preferred embodiment, each container 10 requires four (4) webs 20. The two (2) sides including the web 24, edging 26 and seam cover 28 are shown in FIG. 20 and the two (2) sides including the handle 60, web 24, edging 26 and seam cover 28 are shown in FIG. 25. Stitching of each edging 26 starts and ends at the seam cover 28, thereby leaving a small space between ends 27 and 29 of each edging 26.

Figure 26A:
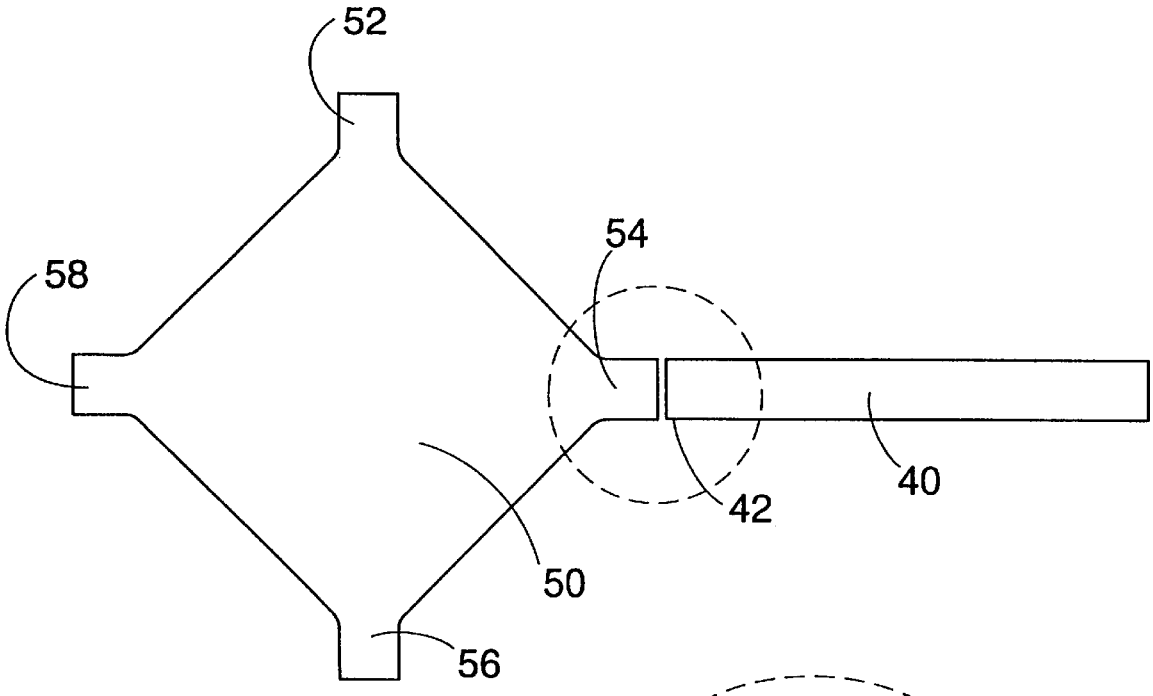
Figure 26B:
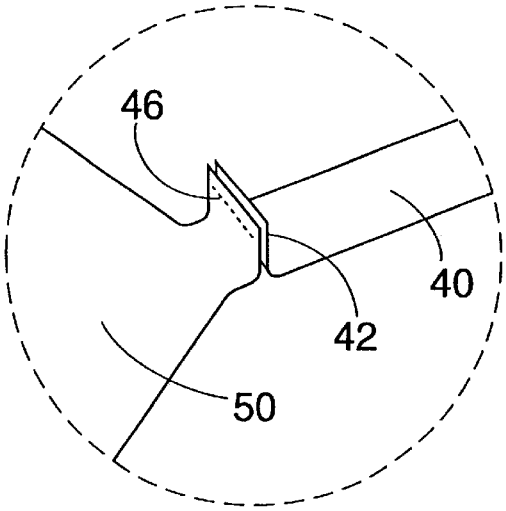
Figure 27:
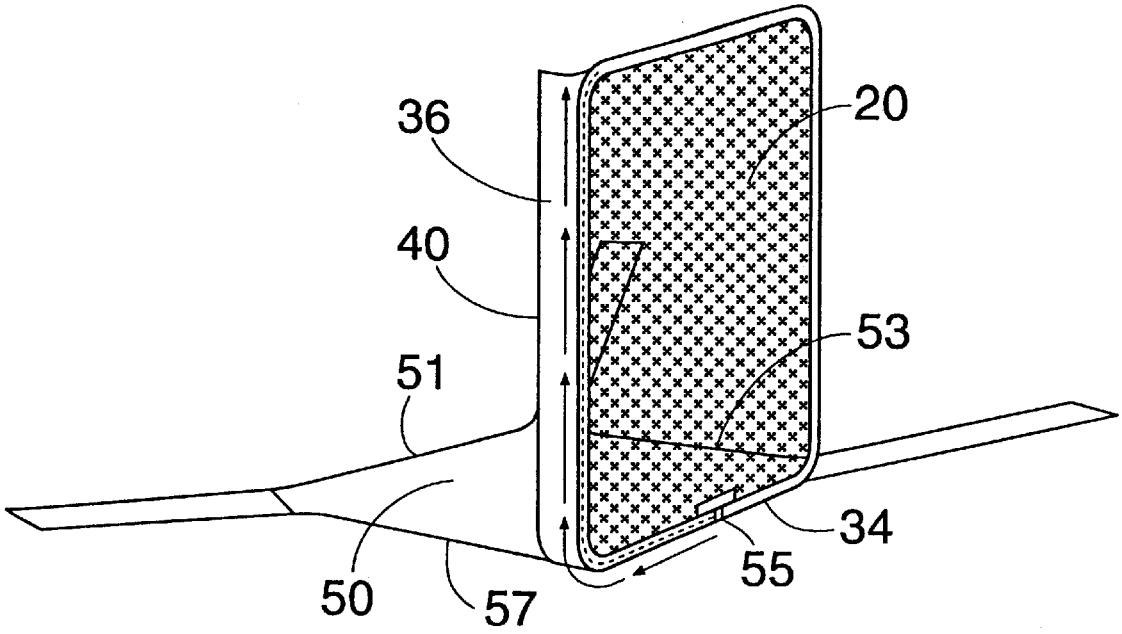
Figure 28:
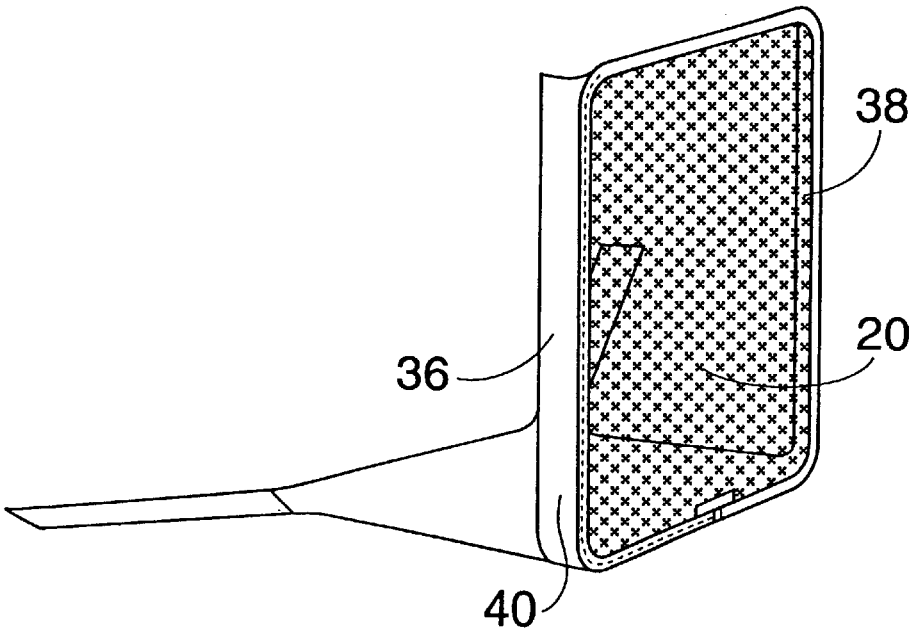
Figure 29:
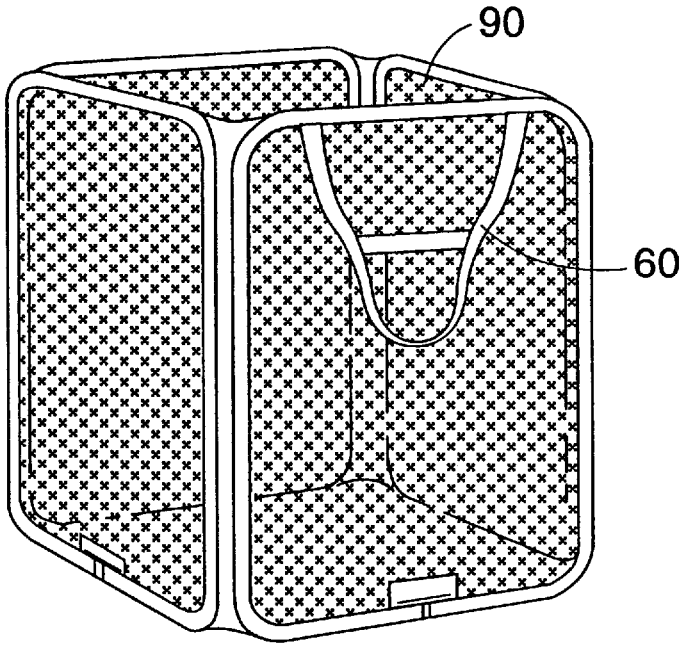

In FIGS. 26A and 26B, the next step involves stitching each corner section 52, 54, 56, 58 of the floor panel 50 to the end 42 of each side panel separator 40. The stitching is shown at 46. Now referring to FIGS. 27 and 28, the step of attaching each of the four side panels 20 by means of stitching to the floor panel 50 and the side panel separators 40 is shown. The two (2) side panels 20 containing the handles 60 and 62 should be positioned opposite each other with the handles 60 and 62 facing inwardly toward each other. First, the floor side 34 of each of the side panels 20 is stitched to one of the sides 51, 53, 55, 57 of the floor panel 50 as shown in FIG. 23. Still referring to FIG. 23, next the lateral sides 36 of each of the side panels 20 is stitched to the corresponding adjacent side panel separator 40. As shown in FIG. 28, once the first lateral side 36 of a side panel separator 40 is stitched on one side, the second lateral side 38 of another side panel separator 40 is stitched to the other side. The resulting enclosure 90 is shown in FIG. 29.

As discussed previously, the container 10 may be constructed without the side panel separators 20. In constructing the embodiment without side panel separators, the two (2) side panels 20 containing the handles 60 and 62 are positioned opposite each other with their handles 60 and 62 facing inwardly toward each other. The floor side 34 of each of the side panels 20 is stitched to one of the sides 51, 53, 55, 57 of the floor panel 50. Next the lateral sides 36 of each of the side panels 20 are stitched to an adjacent side panel 20 thus forming the container 10 having an open top 16.

Figure 30:
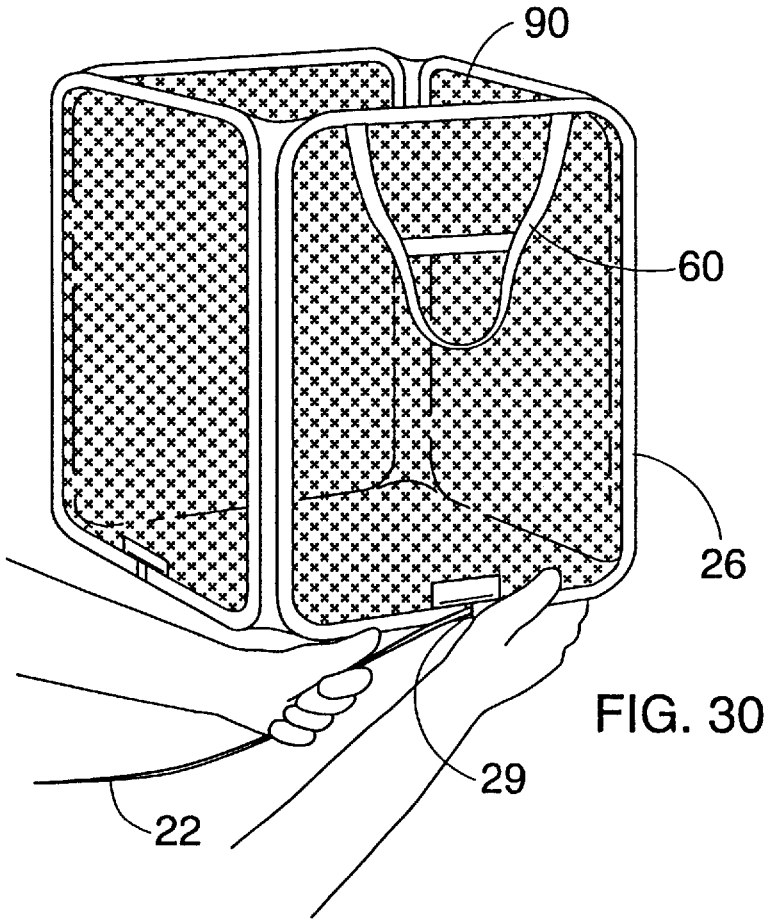

The final steps of the manufacturing process of the present invention involve inserting the frame 22 in one of the open ends 27 or 29 of each of the edgings 26 as shown in FIG. 30. The frame 22 is passed through the edging 26 and around the periphery of each of the side panels 20. The ends of the frame 22 are joined together such that the frame 22 forms a continuous loop. In the preferred embodiment, the frame ends are connected by inserting each end into a butt connector and crimping the connector. Finally, the unstitched portion of each seam cover 28 is stitched to side 21 of each web 24 and over the ends 27 and 29 of each edging 26, thereby protecting the frame 22 from escaping the edgings 26.

Figure 31:
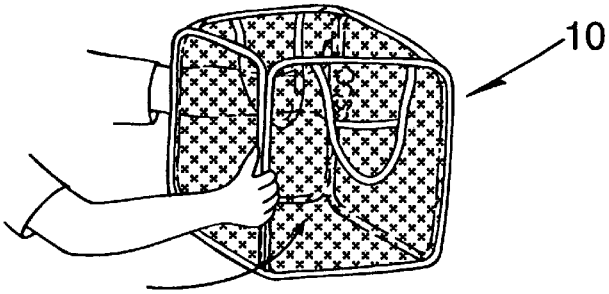
FIGS. 31 through 36 depict the method of collapsing the collapsible container.
Figure 34:
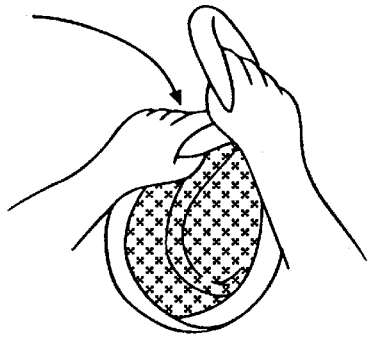
Figure 32:
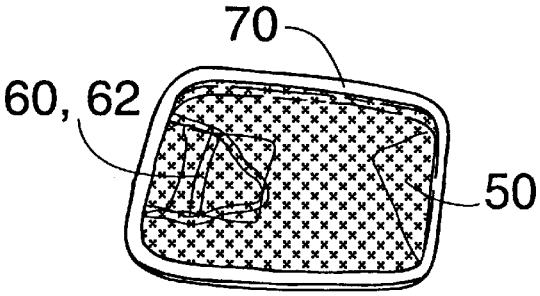
Figure 35:
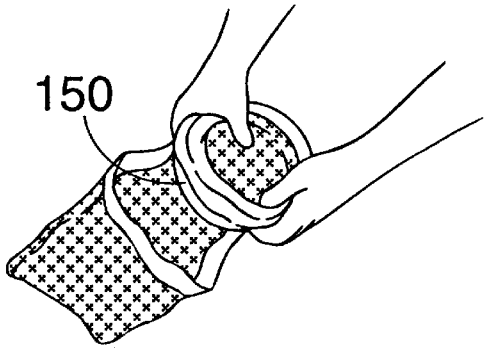
Figure 33:
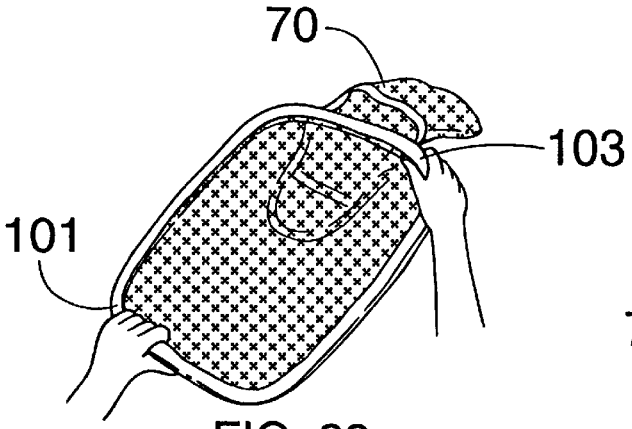
Figure 36:
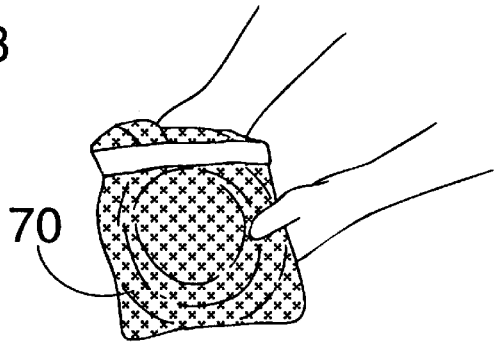

From the expanded state, the container 10 may be folded into a collapsed state for storage and transportation. FIGS. 31 to 36 show various steps for collapsing the container 10. Referring to FIG. 31, the first step requires grasping opposite sides of the container 10 and biasing one toward the other until all side panels 20 are adjacent and overlie each other. The next step includes inserting the handle members 60 and 62 and the floor panel 50 in between any two of the adjacent overlying side panels 20 is shown in FIG. 32. It is important to make sure that the storage pouch 70 remains outside of the collapsed side panels 20. In the preferred embodiment, the resulting partially collapsed container 10 is a stack of four side panels 20. FIGS. 33 and 34 show the next step of rotating two opposite corners 101 and 103 of the partially collapsed container 10 in opposite directions while biasing the corners 101, 103 toward each other. The container 10 will first twist and then will rotate to form three overlying circular loops 150 situated adjacently as shown in FIG. 35. The final step, shown in FIG. 36, is the insertion of the collapsed container 10 into the storage pouch 70.

When the collapsed container 10 is removed from the storage pouch 70, the frame members 22 will bias the container 10 into its fully expanded state. Again, the fully expanded state of the preferred embodiment is that shown in FIG. 4.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A collapsible container having an open top, said collapsible container comprising:

a plurality of adjacent side panels, each of said side panels including a *continuous, non-interrupted, planar* web having a perimeter, an edging attached to substantially the entire perimeter of the web and forming a continuous peripheral pocket, and a continuous loop frame;

the frame being positioned within the continuous pocket;

each of said side panels having a bottom side, a top side and two lateral sides;

a floor panel having a plurality of sides, each of said floor panel sides being attached to at least one of said side panel bottom sides;

each of said lateral sides of each side panel being attached to the lateral side of an adjacent side panel.

2. The collapsible container of claim 1, further comprising at least one handle member, said handle member being secured to at least one of said side panels.

[3. The collapsible container of claim 1, further comprising at least one aperture being formed within at least one side panel.]

4. The collapsible container of claim 1, further including a storage pouch, said storage pouch being coupled to one of said side panels near said open top.

5. The collapsible container of claim 1, wherein said side panels are substantially rectangular.

6. The collapsible container of claim 1, wherein said plurality of side panels if four.

7. The collapsible container of claim 1, wherein said frame of each of said side panels is flexible.

8. The collapsible container of claim 1, wherein said plurality of side panels is an even number.

9. A collapsible container having an open top, said container comprising:

a plurality of side panels, each of said side panels including a web having a perimeter, an edging attached to the perimeter of the web and forming a pocket, and a continuous loop frame;

the frame being positioned within the edging pocket;

each of said side panels having a bottom side and at least two lateral sides;

a plurality of side panel separators, said panel separators each having a first end, a second end, and two lateral sides;

a floor panel having a plurality of sides and a plurality of corner sections, each of said floor panel sides being attached to the bottom side of at least one of said side panels;

each corner section of said floor panel being coupled to the first end of one of said side panel separators; and each of said lateral sides of each side panel separator being attached to a lateral side of a side panel.

10. The collapsible container of claim 9, further comprising at least one handle member, said handle member being secured to at least one of said side panels.

11. The collapsible container of claim 9, further comprising a seam cover attached to said side panels and substantially enveloping a predetermined portion of said edging.

[12. The collapsible container of claim 9, further comprising at least one aperture being formed within at least one side panel.]

13. The collapsible container of claim 9, further including a storage pouch, said storage pouch being coupled to one of said side panels near said open top.

14. The collapsible container of claim 9, wherein said side panels are substantially rectangular.

15. The collapsible container of claim 9, wherein said plurality of side panels is an even number.

16. The collapsible container of claim 9, wherein said web of each of said side panels is flexible web of material.

17. The collapsible container of claim 9, wherein said frame of each of said side panels is flexible.

18. A method of collapsing a collapsible container comprising a plurality of side panels, a floor panel, a plurality of side panel separators, at least one handle member, and a storing structure, said method comprising the steps of:

biasing a corner of said collapsible container toward an opposite corner until said side panels are adjacent and overlie each other;

inserting said handle members and said floor panel between two of said adjacent side panels;

rotating two opposite corners of said adjacent overlying side panels in opposite directions;

biasing said two corners toward each other and forming three adjacent circular loops overlying each other;

inserting said adjacent overlaying circular loops into said storing structure.

*19. A collapsible container having an open top, said container comprising:*

*a plurality of side panels, each of said side panels including a continuous, non-interrupted, planar web having a perimeter, an edging attached to the perimeter of the web and forming a pocket, and a continuous loop frame;*

*the frame being positioned within the edging pocket;*

*each of said side panels having a bottom side and at least two lateral sides;*

*a plurality of side panel separators, said panel separators each having a first end, a second end, and two lateral sides;*

*a floor panel having a plurality of sides and a plurality of corner sections, each of said floor panel sides being attached to the bottom side of at least one of said side panels;*

*each corner section of said floor panel being coupled to the first end of one of said side panel separators; and*

*each of said lateral sides of each side panel separator being attached to a lateral side of a side panel.*

*20. The collapsible container of claim 19, further comprising at least one handle member, said handle member being secured to at least one of said side panels.*

*21. The collapsible container of claim 19, further comprising a seam cover attached to said side panels and substantially enveloping a predetermined portion of said edging.*

*22. The collapsible container of claim 19, further including a storage pouch, said storage pouch being coupled to one of said side panels near said open top.*

*23. The collapsible container of claim 19, wherein said side panels are substantially rectangular.*

*24. The collapsible container of claim 19, wherein said plurality of side panels is an even number.*

*25. The collapsible container of claim 19, wherein said web of each of said side panels is flexible web of material.*

*26. The collapsible container of claim 19, wherein said frame of each of said side panels is flexible.*

* * * * *